(12) United States Patent
Nakamura et al.

(10) Patent No.: US 9,178,460 B2
(45) Date of Patent: Nov. 3, 2015

(54) MOTOR CONTROLLER

(71) Applicant: SANYO DENKI CO., LTD., Tokyo (JP)

(72) Inventors: Toshiyuki Nakamura, Tokyo (JP); Yo Muramatsu, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 211 days.

(21) Appl. No.: 13/944,175

(22) Filed: Jul. 17, 2013

(65) Prior Publication Data

US 2014/0021902 A1 Jan. 23, 2014

(30) Foreign Application Priority Data

Jul. 19, 2012 (JP) ................................. 2012-160680

(51) Int. Cl.
| H02P 7/00 | (2006.01) |
| H02P 6/18 | (2006.01) |
| H02P 6/20 | (2006.01) |
| H02P 23/00 | (2006.01) |
| F04D 25/08 | (2006.01) |
| H02P 6/08 | (2006.01) |

(52) U.S. Cl.
CPC ................ *H02P 23/00* (2013.01); *F04D 25/08* (2013.01); *H02P 6/085* (2013.01)

(58) Field of Classification Search
CPC ........... G06F 15/7832; G06F 9/30196; H03K 19/0013; H03K 5/086; H03K 17/08; H03K 3/356139; H03K 3/356156; G05F 1/56; H01H 47/325; H01R 12/721; H02J 7/0031; H02M 2001/385; H02M 7/53873; H02P 7/29; H02P 9/48; H02P 6/08; H05B 6/666; H05K 2201/10159; H05K 3/42; H05K 7/20209
USPC .............. 318/545, 549, 811, 400.01, 400.08, 318/599, 503; 322/28; 326/83, 17, 20, 44, 326/87; 327/374; 361/154, 18, 777, 94
See application file for complete search history.

(56) References Cited

U.S. PATENT DOCUMENTS

| 3,363,024 | A | * | 1/1968 | Majumdar et al. ............ 208/142 |
| 4,719,400 | A | * | 1/1988 | Kurakake et al. .............. 318/811 |
| 4,860,148 | A | * | 8/1989 | Iwamura et al. ................. 361/58 |
| 6,054,823 | A | * | 4/2000 | Collings et al. .......... 318/400.04 |
| 6,392,372 | B1 | * | 5/2002 | Mays, II ................... 318/400.01 |
| 6,545,438 | B1 | * | 4/2003 | Mays, II ................... 318/400.01 |
| 6,933,699 | B2 | * | 8/2005 | Hsu et al. ....................... 318/635 |
| 2007/0047199 | A1 | | 3/2007 | Tsutsui |
| 2015/0028780 | A1 | * | 1/2015 | Hatakeyama et al. ..... 318/400.1 |

FOREIGN PATENT DOCUMENTS

JP 2007-65870 3/2007

* cited by examiner

*Primary Examiner* — Rita Leykin
(74) *Attorney, Agent, or Firm* — Novak Druce Connolly Bove + Quigg LLP

(57) ABSTRACT

A motor controller according to the invention includes a driving IC and a magnetic sensor. The driving IC receives a driving signal for driving a motor and controls the rotation speed of the motor using the driving signal. The magnetic sensor detects the rotation speed of the motor. The driving IC includes a sensor signal output terminal and a driving signal input terminal. The sensor signal output terminal outputs a sensor signal generated by the driving IC based on a pulse signal from the magnetic sensor. The driving signal input terminal receives the driving signal. The sensor signal output terminal and the driving signal input terminal are connected by a connecting portion. The driving IC rotates the motor at a first rotation speed different from the rotation speed of the motor driven according to the driving signal using the sensor signal input to the driving signal input terminal.

9 Claims, 6 Drawing Sheets

MOTOR CONTROLLER

CROSS-REFERENCE TO RELATED APPLICATION

This application claims priority to Japanese Application No. 2012-160680, filed Jul. 19, 2012, the entirety of which is incorporated herein by reference.

BACKGROUND

1. Technical Field

The present invention relates to a motor controller that obtains multiple steps of rotation speeds using a sensor signal output during the rotation of a motor.

2. Description of Related Arts

Information equipment such as a computer or a server cools down components incorporated therein using a cooling fan attached to a housing thereof. In general, the rotation speed of the cooling fan is changed based on the temperature of the housing of the information equipment or the temperature of the constituent components of the information equipment.

In the invention disclosed in JP 2007-65870 A, a cooling fan is rotated at a first rotation speed when the power of information equipment is turned on and the cooling fan is rotated at a second rotation speed faster than the first rotation speed when the temperature of the constituent components of the information equipment increases and needs to be lowered.

In the related art, as disclosed in JP 2007-65870 A, the rotation speed of the cooling fan is changed by changing a duty ratio of a PWM signal applied to the cooling fan. Thus, in order to change the rotation speed of the cooling fan, a controller that can output the PWM signal is essentially necessary.

However, there is a demand for easily obtaining multiple steps of rotation speeds without using the controller that can output the PWM signal. In the case of a motor controller using the controller that can output the PWM signal, it is difficult to meet such a demand of the related art.

SUMMARY

The invention has been made to meet the above demand, and an object of the invention is to provide a motor controller that obtains multiple steps of rotation speeds by effectively using a sensor signal output during rotation of a motor without using a controller that can output a PWM signal.

In order to attain the object, the invention provides a motor controller that includes a driving IC and a sensor.

The driving IC receives a driving signal for driving a motor and controls the rotation speed of the motor using the driving signal. The sensor detects the rotation speed of the motor.

The driving IC includes a sensor signal output terminal and a driving signal input terminal.

The sensor signal output terminal outputs a sensor signal generated by a pulse signal from the sensor. The driving signal input terminal receives the driving signal. The sensor signal output terminal and the driving signal input terminal are connected by a connecting portion.

The driving IC rotates the motor at a first rotation speed different from the rotation speed of the motor driven according to the driving signal using the sensor signal input to the driving signal input terminal.

According to the motor controller of the invention having such a configuration, since the sensor signal output during rotation of the motor is effectively used, it is possible to obtain multiple steps of rotation speeds without using a controller that can output a PWM signal.

DETAILED DESCRIPTION

Hereinafter, first and second embodiments of a motor controller according to the invention will be described.

First Embodiment

A motor controller according to the first embodiment can rotate a motor at two steps of speeds without using a controller that can output a PWM signal.

(Configuration of Motor Controller)

Figure 1:
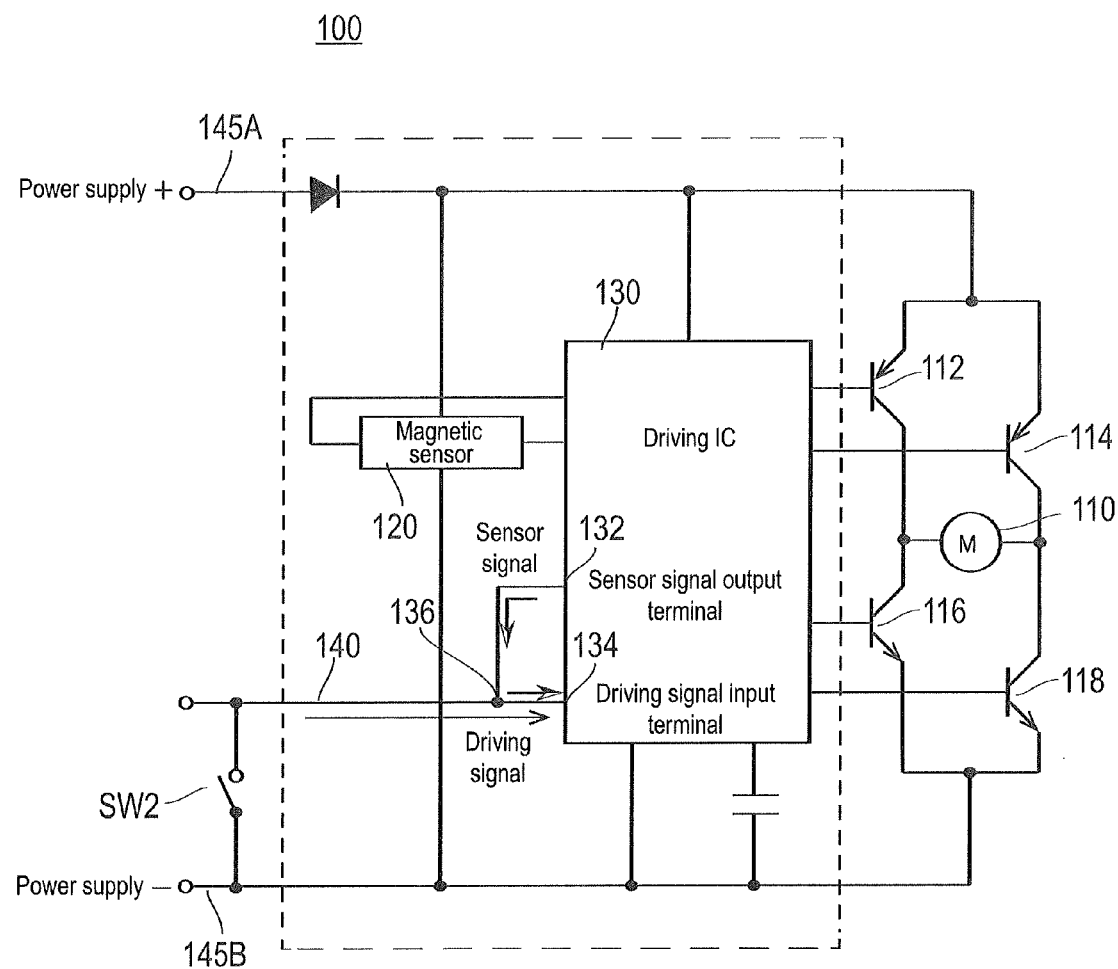
FIG. 1 is a block diagram of a motor controller according to a first embodiment.

FIG. 1 is a block diagram of a motor controller according to the first embodiment.

A motor controller 100 includes a magnetic sensor 120 for detecting a rotation speed of a motor 110 and a driving IC 130 that receives a driving signal for driving the motor 110 and controls the rotation speed of the motor 110 using the driving signal.

Switching transistors 112, 114, 116, and 118 are connected to the driving IC 130. The switching transistors 112, 114, 116, and 118 form an H-bridge circuit in order to control the rotation speed and the rotating direction of the motor 110.

The magnetic sensor 120 generates a pulse signal in response to rotation detection magnet poles attached to a rotor (not illustrated) of the motor 110. 2n rotation detection magnet poles are arranged at phases of 180° in the rotating direction of the rotor. Thus, the magnetic sensor 120 outputs such a pulse signal of which the level changes periodically between HI and LOW 2n times whenever the rotor makes one rotation. The pulse signal output by the magnetic sensor 120 is input to the driving IC 130.

The driving IC 130 includes a sensor signal output terminal 132 and a driving signal input terminal 134. The driving IC 130 receives the pulse signal output by the magnetic sensor 120 and outputs a pulsating sensor signal having a duty ratio of 50% from the sensor signal output terminal 132. A driving signal line 140 is connected to the driving signal input terminal 134. A driving signal for rotating the motor 110 at a predetermined rotation speed is supplied from the outside to the driving signal input terminal 134 via the driving signal line 140. The driving signal may be simply a DC signal having a constant voltage value and may be a PWM signal having a constant duty ratio. In the present embodiment, a DC signal having a constant voltage value is used as the driving signal.

The driving IC 130 stores a rotation speed (first rotation speed) of the motor 110 when the sensor signal is input to the driving signal input terminal 134. When a DC voltage having a constant voltage value is input to the driving signal input terminal 134, for example, rotation speed data for rotating the motor 110 at a rotation speed corresponding to 100% of its rated rotation speed is stored in the driving IC 130. Moreover, when the sensor signal is input to the driving signal input terminal 134, rotation speed data for rotating the motor 110 at a rotation speed corresponding to 50% of its rated rotation speed is stored in the driving IC 130. Further, when a negative-side power supply voltage is input to the driving signal input terminal 134, rotation speed data for stopping the motor 110 is stored in the driving IC 130.

Therefore, the driving IC 130 rotates the motor 110 at a first rotation speed different from the rotation speed of the motor 110 that is driven by the driving signal using the sensor signal input to the driving signal input terminal 134. For example, when a DC signal having a constant voltage value is input to the driving signal input terminal 134, the driving IC 130 rotates the motor 110 at a rotation speed corresponding to 100% of its rated rotation speed. However, when the sensor signal is input to the driving signal input terminal 134, the driving IC 130 decreases the rotation speed of the motor 110 from 100% of its rated rotation speed to 50% of its rated rotation speed.

The sensor signal output terminal 132 and the driving signal input terminal 134 are connected by a connecting portion 136. Thus, the sensor signal output from the sensor signal output terminal 132 is input to the driving signal input terminal 134 and is output to the outside via the driving signal line 140.

The driving IC 130 is connected to two power supply lines 145A and 145B that connect the driving IC 130 to the power supply and one driving signal line 140 that connects the sensor signal output terminal 132 and the driving signal input terminal 134. A switch SW2 is connected between the power supply line 145B and the driving signal line 140. The switch SW2 short-circuits the power supply line 145B and the driving signal input terminal 134.

Therefore, when the switch SW2 is turned on and the power supply line 145B and the driving signal input terminal 134 are short-circuited, the driving IC 130 rotates the motor 110 at a second rotation speed slower than the first rotation speed or stops the motor 110. For example, when the sensor signal is input to the driving signal input terminal 134, the driving IC 130 rotates the motor 110 at a rotation speed (the first rotation speed) corresponding to 50% of its rated rotation speed. However, when the switch SW2 is turned on, since a negative-side power supply voltage is input to the driving signal input terminal 139, the driving IC 130 stops the motor 110 (the second rotation speed).

The driving IC 130 selectively applies a switching signal to the switching transistors 112, 114, 116, and 118. When the driving IC 130 applies a switching signal to the switching transistors 112 and 118 and does not apply a switching signal to the switching transistors 114 and 116, the motor 110 rotates, for example, in the clockwise direction, at a rotation speed corresponding to an average voltage determined by the switching signal. On the other hand, when the driving IC 130 applies a switching signal to the switching transistors 114 and 116 and does not apply a switching signal to the switching transistors 112 and 118, the motor 110 rotates, for example, in the counterclockwise direction, at a rotation speed corresponding to an average voltage determined by the switching signal.

(Operation of Motor Controller)

Figure 2:
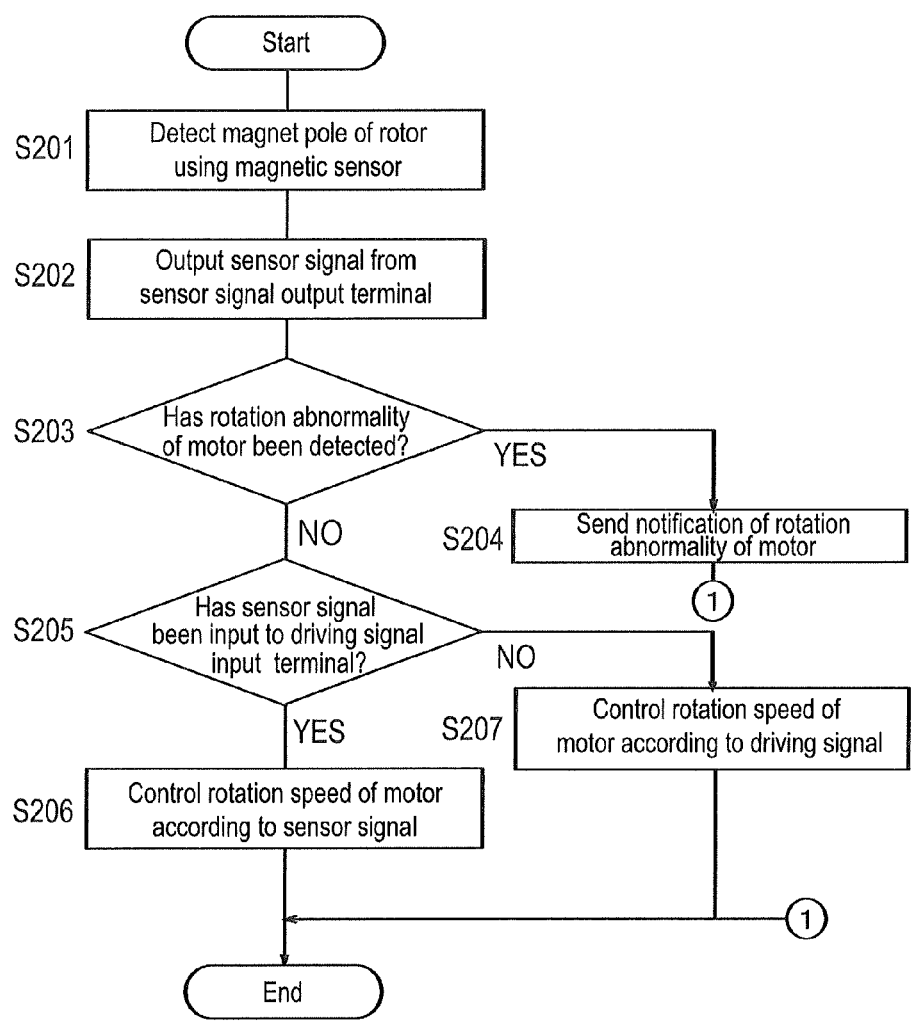
FIG. 2 is a flowchart illustrating an operation of the motor controller of FIG. 1.
Figure 3:
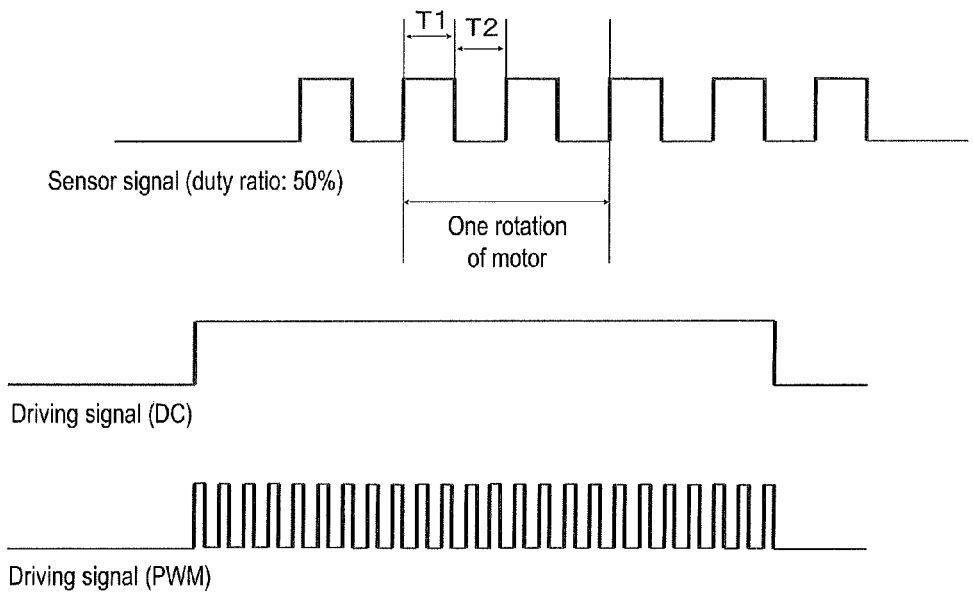
FIG. 3 is a diagram illustrating an example of a sensor signal output from a driving IC and a driving signal input to the driving IC.
Figure 4:
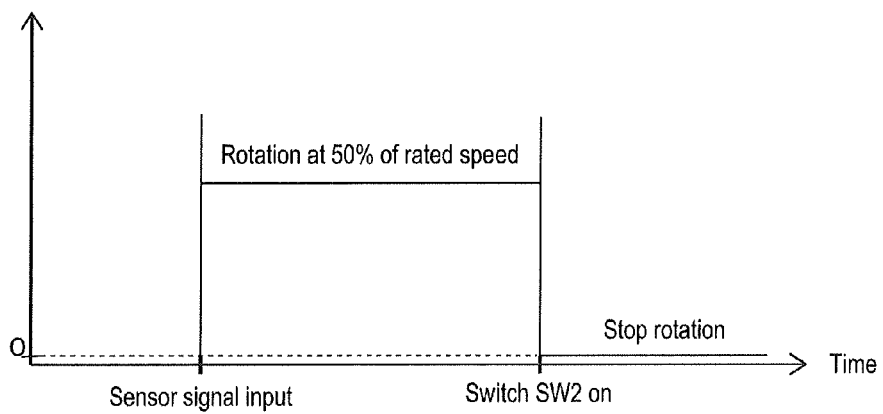
FIG. 4 is a diagram provided for describing a change in a rotation speed of a motor in the motor controller of FIG. 1.

FIG. 2 is a flowchart illustrating the operation of the motor controller of FIG. 1. FIG. 3 is a diagram illustrating an example of a sensor signal output from the driving IC and a driving signal input to the driving IC. FIG. 4 is a diagram provided for describing a change in the rotation speed of the motor in the motor controller of FIG. 1.

The magnetic sensor 120 detects a magnet pole attached to the rotor of the motor 110. The magnetic sensor 120 outputs a HI-level signal when the magnetic sensor 120 detects a magnet pole, and the magnetic sensor 120 outputs a LOW-level signal when the magnetic sensor 120 does not detect a magnet pole. Thus, the magnetic sensor 120 outputs a pulse signal of which the level changes periodically between HI and LOW whenever the rotor makes one rotation (S201).

Upon receiving the pulse signal output by the magnetic sensor 120, the driving IC 130 outputs a pulsating sensor signal having a duty ratio of 50% as illustrated in FIG. 3, from the sensor signal output terminal 132. As illustrated in FIG. 3, the sensor signal having a duty ratio of 50% has the same HI period T1 as the LOW period T2 (S202).

The driving IC 130 detects a rotation abnormality of the motor 110 using the input pulse signal. For example, since rotational irregularity of the motor 110 occurs when the repetition of HI and LOW of the pulse signal is irregular, it is determined that a certain trouble has occurred. Moreover, when the pulse signal is not output and remains in the HI or LOW state, it is determined that the motor 110 is locked (S203).

When the driving IC 130 has detected a rotation abnormality of the motor 110 (YES in S203), the driving IC 130 informs an external display device (not illustrated) of a rotation abnormality of the motor 110 (S204).

When the driving IC 130 has not detected a rotation abnormality of the motor 110 (NO in S203), the driving IC 130 determines whether a sensor signal is input to the driving signal input terminal 134 (S205).

When the sensor signal is input to the driving IC 130 (YES in S205), the driving IC 130 controls the rotation speed of the motor 110 according to the sensor signal.

As described above, when the sensor signal is input to the driving signal input terminal 134, the rotation speed data for rotating the motor 110 at a rotation speed corresponding to 50% of its rated rotation speed is stored in the driving IC 130.

Therefore, when the sensor signal having a duty ratio of 50% as illustrated in FIG. 3 is input to the driving IC 130, the driving IC 130 selectively applies a switching signal to the switching transistors 112 and 118, for example, and rotates the motor 110 in the clockwise direction at a rotation speed (the first rotation speed) corresponding to 50% of its rated rotation speed (S206).

On the other hand, when the sensor signal is not input to the driving IC 130 (NO in S205), the driving IC 130 controls the rotation speed of the motor 110 according to the driving signal.

As described above, when a DC voltage having a constant voltage value is input to the driving signal input terminal 134, the rotation speed data for rotating the motor 110 at a rotation speed corresponding to 100% of its rated rotation speed is stored in the driving IC 130. Moreover, when a negative-side power supply voltage is input to the driving signal input terminal 134, the rotation speed data for stopping the motor 110 is stored in the driving IC 130.

Therefore, when a DC voltage having a constant voltage value as illustrated in FIG. 3 is input to the driving IC 130, the driving IC 130 selectively applies a switching signal to the switching transistors 112 and 118, for example, and rotates the motor 110 at a rotation speed corresponding to 100% of its rated rotation speed. Moreover, when the switch SW2 is turned on so that the driving signal line 140 and the power supply line 145B are short-circuited, and a negative-side power supply voltage is input to the driving signal input terminal 134, the driving IC 130 stops the motor 110 without outputting the switching signal (S207).

As described above, as illustrated in FIG. 4, the motor controller according to the present embodiment rotates the motor 110 at a rotation speed corresponding to 50% of its rated rotation speed when a sensor signal is input, and stops the motor 110 when the switch SW2 is turned on. That is, the use of the sensor signal enables to easily control the rotation speed in two steps: one is to rotate the motor 110 at a rotation speed corresponding to 50% of its rated rotation speed and the other is to stop the motor 110.

Although not adopted in the present embodiment, as illustrated in FIG. 3, when only the PWM signal is input to the driving signal input terminal 134 as the driving signal, it is possible to change the rotation speed.

In the related art, in order to change the rotation speed of the motor 110, four electric wires in total was required, which are the driving signal line 140 for inputting the driving signal from the outside, a signal line for connecting to the sensor signal output terminal 132 in order to monitor the rotation speed of the motor 110, and two power supply lines 145A and 145B for connecting the driving IC 130 to a power supply. However, in the motor controller 100 according to the present embodiment, since the signal line for connecting the driving signal line 140 and the sensor signal output terminal 132 is shared, three electric wires in total are sufficient. The sensor signal for monitoring the rotation speed of the motor 110 can be output to the outside via the driving signal line 140.

Second Embodiment

A motor controller according to the second embodiment can rotate a motor in three steps of rotation speeds without using a controller that can output a PWM signal.
(Configuration of Motor Controller)

Figure 5:
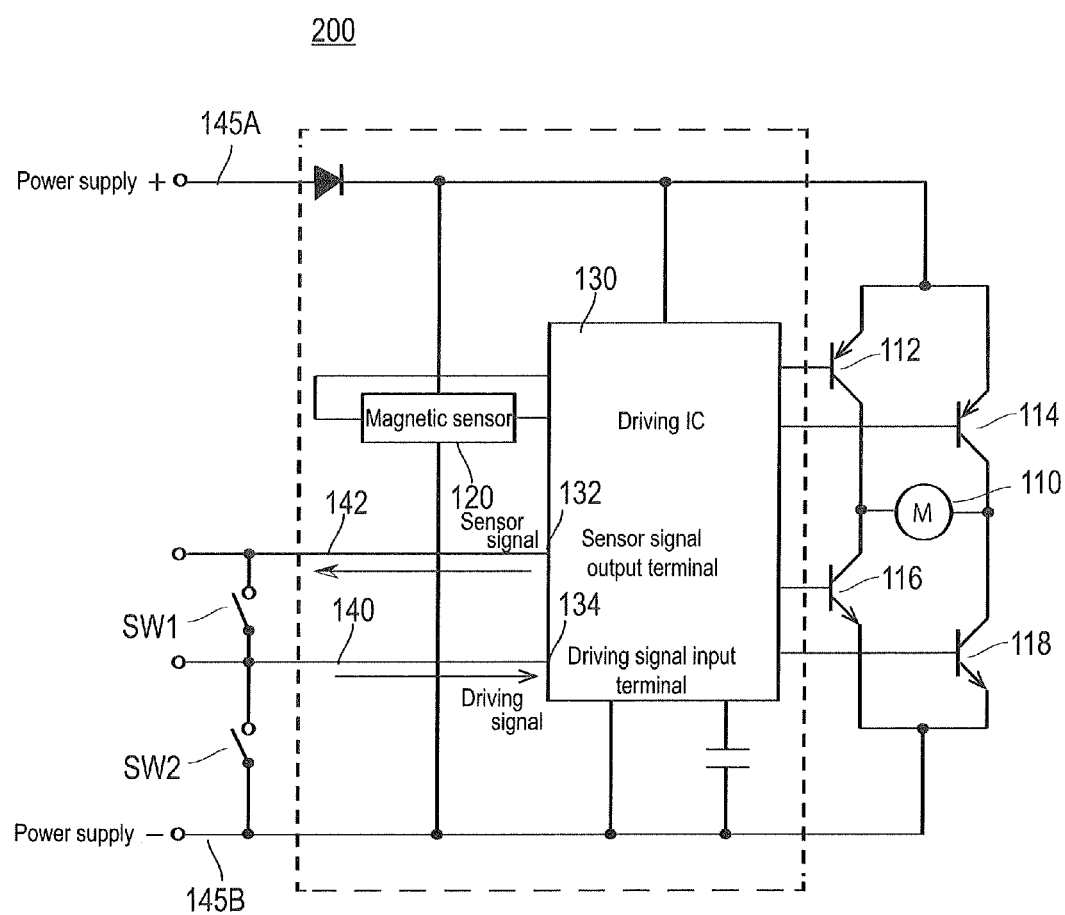
FIG. 5 is a block diagram of a motor controller according to a second embodiment.

FIG. 5 is a block diagram of a motor controller according to the second embodiment.

A motor controller 200 according to the second embodiment has the same configuration as the motor controller 100 according to the first embodiment illustrated in FIG. 1, except for the following.

First, the sensor signal output terminal 132 is not connected to the driving signal input terminal 134, a sensor signal line 142 is connected to the sensor signal output terminal 132, and a switch SW1 that short-circuits the driving signal line 140 and the sensor signal line 142 is provided.

The sensor signal output from the sensor signal output terminal 132 is output to the outside via the sensor signal line 142. The driving signal input from the outside is input to the driving signal input terminal 134 via the driving signal line 140.

The switch SW1 short-circuits the sensor signal line 142 and the driving signal line 140. When the switch SW1 is turned on, since the sensor signal output terminal 132 and the driving signal input terminal 134 are short-circuited, the same configuration as the motor controller 100 according to the first embodiment is achieved. Thus, when the switch SW1 is turned on, the motor 110 rotates at the first rotation speed.

The switch SW2 short-circuits the power supply line 145B and the driving signal input terminal 134 similarly to the first embodiment. Thus, when the switch SW2 is turned on, the motor 110 rotates at the second rotation speed.

When both switches SW1 and SW2 are turned off, the sensor signal is output to the outside via the sensor signal line 142. The rotation speed of the motor 110 can be monitored by measuring the pulse frequency of the sensor signal. Moreover, the driving signal is input to the driving signal input terminal 134 via the driving signal line 140. As illustrated in FIG. 3, the driving signal may be simply a DC signal having a constant voltage value and may be a PWM signal having a constant duty ratio. When a PWM signal is used as the driving signal, by changing the duty ratio thereof, it is possible to continuously change the rotation speed of the motor 110.

The operations of the motor 110, the magnetic sensor 120, the driving IC 130, and the switching transistors 112, 114, 116, and 118 are the same as those of the first embodiment.
(Operation of Motor Controller)

Figure 6:
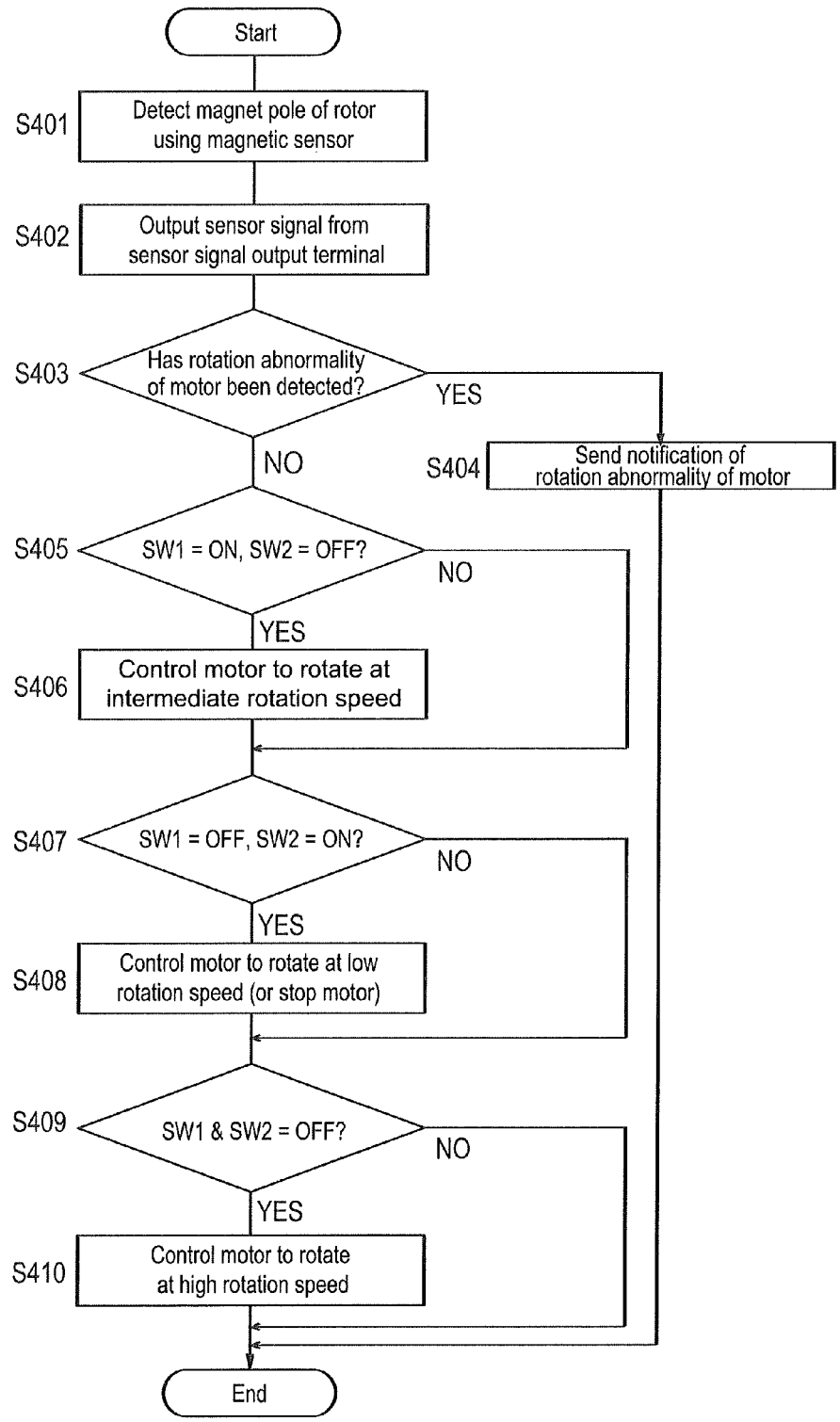
FIG. 6 is a flowchart illustrating an operation of the motor controller of FIG. 5.
Figure 7:
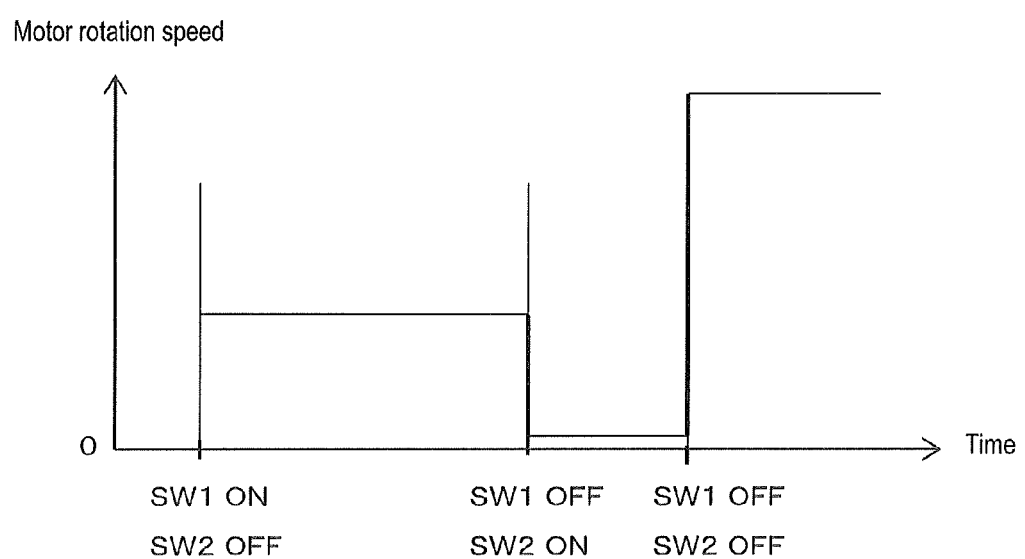
FIG. 7 is a diagram provided for describing a change in a rotation speed of a motor in the motor controller of FIG. 5.

FIG. 6 is a flowchart illustrating the operation of the motor controller of FIG. 5. FIG. 7 is a diagram provided for describing a change in the rotation speed of the motor in the motor controller of FIG. 5.

The magnetic sensor 120 detects a magnet pole attached to the rotor of the motor 110. The magnetic sensor 120 outputs a HI-level signal when the magnetic sensor 120 detects a magnet pole, and the magnetic sensor 120 outputs a LOW-level signal when the magnetic sensor 120 does not detect a magnet pole. Thus, the magnetic sensor 120 outputs a pulse signal of which the level changes periodically between HI and LOW whenever the rotor makes one rotation (S401).

Upon receiving the pulse signal output by the magnetic sensor 120, the driving IC 130 outputs a pulsating sensor signal having a duty ratio of 50% as illustrated in FIG. 3, from the sensor signal output terminal 132. As illustrated in FIG. 3, the sensor signal having a duty ratio of 50% has the same HI period T1 as the LOW period T2 (S402).

The driving IC 130 detects a rotation abnormality of the motor 110 using the input pulse signal. For example, since rotational irregularity of the motor 110 occurs when the repetition of HI and LOW of the pulse signal is irregular, it is determined that a certain trouble has occurred. Moreover, when the pulse signal is not output and remains in the HI or LOW state, it is determined that the motor 110 is locked (S403).

When the driving IC 130 has detected a rotation abnormality of the motor 110 (YES in S403), the driving IC 130 outputs a rotation abnormality of the motor 110 to an external display device (not illustrated) (S404).

When the driving IC 130 has not detected a rotation abnormality of the motor 110 (NO in S403), the driving IC 130 controls the rotation speed of the motor 110 in the following manner based on the ON/OFF state (S405, S407, and S409) of the switches SW1 and SW2.

When the switch SW1 is turned on and the switch SW2 is turned off (YES in S405), since the sensor signal is input to the driving signal input terminal 134, the driving IC 130 controls the rotation speed of the motor 110 to be an intermediate rotation speed.

As described above, when the sensor signal is input to the driving signal input terminal 134, the rotation speed data for rotating the motor 110 at a rotation speed corresponding to 50% of its rated rotation speed is stored in the driving IC 130.

Therefore, when the sensor signal having a duty ratio of 50% as illustrated in FIG. 3 is input to the driving IC 130, the driving IC 130 selectively applies a switching signal to the switching transistors 112 and 118, for example, and rotates the motor 110 in the clockwise direction at a rotation speed (the first rotation speed) corresponding to 50% of its rated rotation speed (S406).

On the other hand, when the switch SW1 is turned on and the switch SW2 is not turned off (NO in S405), it is determined whether the switch SW1 is turned off and the switch SW2 is turned on (S407). When the switch SW1 is turned off and the switch SW2 is turned on (YES in S407), since the power supply line 145B and the driving signal input terminal 134 are short-circuited, a negative-side power supply voltage is input to the driving signal input terminal 134.

As described above, when a negative-side power supply voltage is input to the driving signal input terminal 134, rotation speed data for rotating the motor 110 at a low rotation speed or stopping the motor 110 is stored in the driving IC 130.

Therefore, when a negative-side power supply voltage is input to the driving signal input terminal 134, the driving IC 130 selectively applies a switching signal to the switching transistors 112 and 118 or rotates the motor 110 in a clockwise direction at a low rotation speed (the second rotation speed) or stops the motor 110 without outputting the switching signal (S408).

On the other hand, when the switch SW1 is turned off and the switch SW2 is not turned on (NO in S407), it is determined whether both switches SW1 and SW2 are turned off (S409). When both switches SW1 and SW2 are turned off (NO in S409), the driving IC 130 controls the rotation speed of the motor 110 according to the driving signal.

As described above, when a DC voltage having a constant voltage value is input to the driving signal input terminal 134, the rotation speed data for rotating the motor 110 at a rotation speed corresponding to 100% of its rated rotation speed is stored in the driving IC 130.

Therefore, when a DC signal having a constant voltage value as illustrated in FIG. 3 is input to the driving IC 130, the driving IC 130 selectively applies a switching signal to the switching transistors 112 and 118, for example, and rotates the motor 110 at a high rotation speed (third rotation speed) corresponding to 100% of its rated rotation speed (S410).

As described above, as illustrated in FIG. 7, the motor controller according to the present embodiment rotates the motor 110 at an intermediate rotation speed corresponding to 50% of its rated rotation speed when the switch SW1 is turned on and the switch SW2 is turned off. Moreover, the motor controller rotates the motor 110 at a low rotation speed or stops the motor 110 when the switch SW1 is turned off and the switch SW2 is turned on. Further, the motor controller rotates the motor 110 at a high rotation speed corresponding to 100% of its rated rotation speed according to the driving signal input to the driving signal input terminal 134 when both switches SW1 and SW2 are turned off.

In the present embodiment, by using the PWM signal as illustrated in FIG. 3 as the driving signal input to the driving signal input terminal 134, the rotation speed when both switches SW1 and SW2 are turned off can be changed to an optional rotation speed.

In the present embodiment, since the sensor signal output terminal 132 and the driving signal input terminal 134 can be connected arbitrarily, it is possible to obtain three steps of rotation speeds: the first is to rotate the motor 110 at an intermediate rotation speed corresponding to 50% of its rated rotation speed, the second is to rotate the motor 110 at a low rotation speed or stop the motor 110, and the third is to rotate the motor 110 at a high rotation speed corresponding to 100% of its rated rotation speed.

As described above, in the first and second embodiments, although the rotation speed of the motor 110 set when the sensor signal is used is 50% of its rated rotation speed, the rotation speed is not limited to this value, and the optimum rotation speed corresponding to the purpose can be stored in the driving IC 130.

By using the PWM signal as the driving signal input to the driving signal input terminal 134 and setting the rotation speed of the motor 110 set when the sensor signal is used to an optional rotation speed, it is possible to control the rotation speed of the motor 110 in various rotation speed patterns.

As described above, according to the motor controller of the invention, it is possible to easily change the rotation speed setting of the motor without using a controller that can output a PWM signal. Thus, the motor controller according to the invention can be ideally used for a cooling fan that cools down information equipment such as a computer or a server.

What is claimed is:

1. A motor controller comprising:
a driving IC that receives a driving signal for driving a motor and controls a rotation speed of the motor using the driving signal; and
a sensor that detects the rotation speed of the motor, wherein
the driving IC includes:
a sensor signal output terminal that outputs a sensor signal generated by a pulse signal from the sensor; and
a driving signal input terminal that receives the driving signal, different from the sensor signal, via a driving signal line,
the sensor signal output terminal and the driving signal input terminal are connected by a connecting portion on the driving signal line, and
wherein the driving IC rotates the motor at a first rotation speed in response to the driving signal received at the driving signal input terminal, and rotates the motor at a second rotation speed in response to the sensor signal received at the driving signal input terminal, the first speed being different from the second speed.

2. A motor controller comprising:
a driving IC that receives a driving signal for driving a motor and controls a rotation speed of the motor using the driving signal; and
a sensor that detects the rotation speed of the motor, wherein
the driving IC includes:
a sensor signal output terminal that outputs a sensor signal generated by a pulse signal from the sensor; and
a driving signal input terminal that receives the driving signal,
the motor controller further includes:
a first switch that short-circuits the sensor signal output terminal and the driving signal input terminal; and
a second switch that short-circuits a power supply line that connects the driving IC to a power supply and the driving signal input terminal, and
the driving IC rotates the motor at a first rotation speed when the first switch is turned on, the second switch is turned off, and the sensor signal output terminal and the driving signal input terminal are short-circuited, rotates the motor at a second rotation speed slower than the first rotation speed or stop the motor when the second switch is turned on, the first switch is turned off, and the power supply line and the driving signal input terminal are short-circuited, and rotates the motor at a third rotation speed faster than the first rotation speed when both the first and second switches are turned off, and the sensor signal output terminal, the driving signal input terminal, and the power supply line are not short-circuited.

3. A motor controller, comprising:
a driving IC that receives a driving signal for driving a motor and controls a rotation speed of the motor using the driving signal; and a sensor that detects the rotation speed of the motor, wherein
the driving IC includes:
- a sensor signal output terminal that outputs a sensor signal generated by a pulse signal from the sensor; and
- a driving signal input terminal that receives the driving signal, the sensor signal output terminal and the driving signal input terminal are connected by a connecting portion,
the driving IC rotates the motor at a first rotation speed different from the rotation speed of the motor driven according to the driving signal using the sensor signal input to the driving signal input terminal, and
a second switch that short-circuits a power supply line that connects the driving IC to a power supply and the driving signal input terminal, wherein
the driving IC rotates the motor at a second rotation speed slower than the first rotation speed or stops the motor when the second switch is turned on and the power supply line and the driving signal input terminal are short-circuited.

4. The motor controller according to claim 1, wherein
the sensor signal output from the sensor signal output terminal is output to the outside via a driving signal line connected to the driving signal input terminal.

5. The motor controller according to claim 1, wherein
the driving IC stores the first rotation speed of the motor when the sensor signal is input to the driving signal input terminal.

6. The motor controller according to claim 1, wherein
the sensor outputs a pulse signal of which the level changes periodically between HI and LOW with rotation of the motor to the driving IC, and the driving IC outputs a pulsating sensor signal having a duty ratio of 50% from the sensor signal output terminal in response to the pulse signal.

7. The motor controller according to claim 3, wherein
the driving IC is connected to two power supply lines that connect the driving IC to a power supply and one driving signal line that connects the sensor signal output terminal and the driving signal input terminal.

8. The motor controller according to claim 2, wherein
the driving IC is connected to two power supply lines that connect the driving IC to a power supply, one sensor signal line connected to the sensor signal output terminal, and one driving signal line connected to the driving signal input terminal.

9. The motor controller according to claim 8, wherein
the first switch is connected to the sensor signal line and the driving signal line, and the second switch is connected to either the driving signal line or the power supply line.

* * * * *